(12) United States Patent
Inoue et al.

(10) Patent No.: US 8,305,865 B2
(45) Date of Patent: Nov. 6, 2012

(54) OPTICAL INFORMATION RECORDING/REPRODUCING OPTICAL SYSTEM AND OPTICAL INFORMATION RECORDING/REPRODUCING APPARATUS

(75) Inventors: Satoshi Inoue, Saitama (JP); Yuta Yoshida, Saitama (JP); Naoto Hashimoto, Tochigi (JP); Suguru Takishima, Tokyo (JP)

(73) Assignee: Hoya Corporation, Tokyo (JP)

( * ) Notice: Subject to any disclaimer, the term of this patent is extended or adjusted under 35 U.S.C. 154(b) by 248 days.

(21) Appl. No.: 12/893,268

(22) Filed: Sep. 29, 2010

(65) Prior Publication Data
US 2011/0103217 A1    May 5, 2011

(30) Foreign Application Priority Data

Nov. 4, 2009  (JP) ................................. 2009-253197
Aug. 16, 2010 (JP) ................................. 2010-181888

(51) Int. Cl.
*G11B 7/135* (2012.01)

(52) U.S. Cl. ............. 369/112.23; 369/112.01; 359/359; 359/580; 359/581; 430/270.11

(58) Field of Classification Search ............. 369/112.01, 369/112.23; 359/580, 581; 430/270.11
See application file for complete search history.

(56) References Cited

U.S. PATENT DOCUMENTS

| | | | | |
|---|---|---|---|---|
| 6,813,096 B2* | 11/2004 | Ohta | ............................. | 359/719 |
| 7,161,744 B2* | 1/2007 | Ohta et al. | ..................... | 359/719 |
| 7,554,736 B2* | 6/2009 | Ohta et al. | ..................... | 359/581 |
| 7,619,821 B2* | 11/2009 | Yamada et al. | ............... | 359/581 |
| 7,803,455 B2* | 9/2010 | Taka et al. | ..................... | 428/216 |
| 2005/0201422 A1 | 9/2005 | Ohta et al. | | |
| 2005/0225879 A1 | 10/2005 | Ohta et al. | | |
| 2008/0212452 A1 | 9/2008 | Hotta et al. | | |

FOREIGN PATENT DOCUMENTS

| | | |
|---|---|---|
| JP | 2005-251354 | 9/2005 |
| JP | 2005-266780 | 9/2005 |
| JP | 2005-302088 | 10/2005 |
| JP | 2008-217886 | 9/2008 |

OTHER PUBLICATIONS

U.S. Appl. No. 12/893,332 to Satoshi Inoue et al., filed Sep. 29, 2010.
U.S. Appl. No. 12/893,382 to Satoshi Inoue et al., filed Sep. 29, 2010.

* cited by examiner

*Primary Examiner* — Wayne Young
*Assistant Examiner* — Brenda Bernardi
(74) *Attorney, Agent, or Firm* — Greenblum & Bernstein P.L.C.

(57) ABSTRACT

An objective lens for an optical information recording/reproducing optical system for an optical disc letting a laser beam impinge on a recording layer of the optical disc, and wherein a center wavelength λ (unit: nm) of the laser beam is in a range defined by a condition: 390≦λ≦420, a base material of the objective lens is made of resin, the resin has a glass transition temperature Tg and light transmissivity T (unit: %) per a path length of 3 mm at a wavelength of 406 nm defined by conditions: Tg≧115° C., 85≦T≦90, same antireflection films or different types of antireflection films are respectively formed on optical surfaces of the objective lens, and each of the antireflection films formed on the objective lens has a thickness of 100 nm or more in a vicinity of an optical axis of the objective lens.

16 Claims, 1 Drawing Sheet

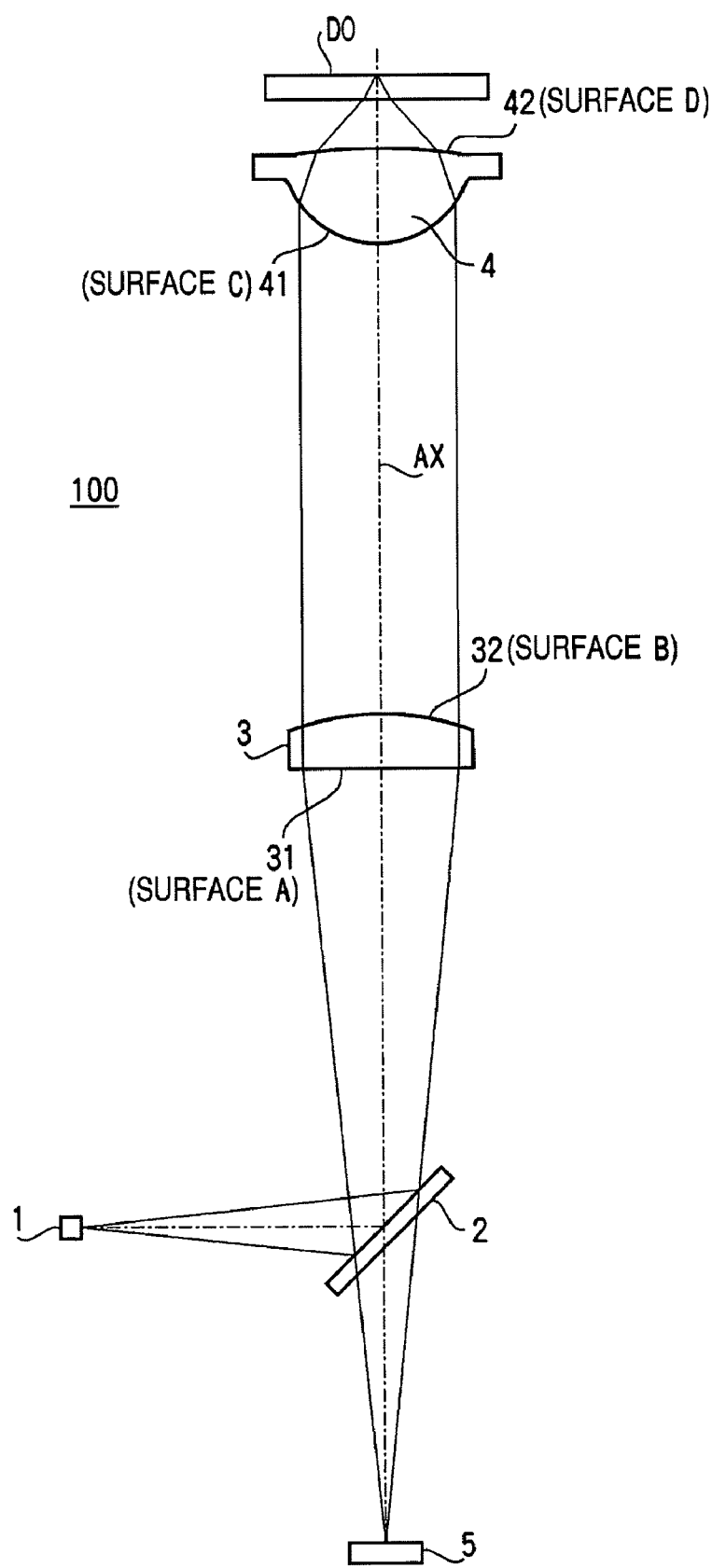

US 8,305,865 B2

OPTICAL INFORMATION RECORDING/REPRODUCING OPTICAL SYSTEM AND OPTICAL INFORMATION RECORDING/REPRODUCING APPARATUS

BACKGROUND OF THE INVENTION

The present invention relates to an optical information recording/reproducing optical system and an optical information recording/reproducing apparatus for recording information to and/or reproducing information from an optical disc based on a predetermined standard by irradiating an information recording layer of the optical disc with a laser beam, and particularly to an optical information recording/reproducing optical system and an optical information recording/reproducing apparatus suitable for information recording/reproducing for a high-recording density optical disc, such as BD (Blu-ray Disc).

There exist various standards of optical discs, such as CD (Compact Disc) and DVD (Digital Versatile Disc), differing in recording density, protective layer thickness, etc. Meanwhile, high-recording density optical discs (e.g., BD), having still higher recording density than DVD, are being brought into practical use in recent years to realize still higher information storage capacity. Incidentally, in this specification, the "optical information recording/reproducing apparatuses" include apparatuses for both information reproducing and information recording, apparatuses exclusively for information reproducing, and apparatuses exclusively for information recording, and the same thing can be said for the "optical information recording/reproducing optical systems". In the following, the "optical information recording/reproducing optical system" is frequently referred to as an optical system of an optical pick-up.

For information recording and reproducing for the high-recording density optical disc (e.g., BD), blue laser light having the wavelength of approximately 400 nm (which is also called violet laser light or bluish-violet laser light) is used. Since such laser light close to the ultraviolet region has a high photon energy, the laser light may have chemical effects on an optical element, such as a resign lens, configuring an optical system of an optical pick-up. One of the chemical effects is a white turbidity phenomenon which is caused in a resign base material of an optical element when the optical element is irradiated with the blue laser light having an intensity of a certain value or more for a long time under a high temperature condition. When the white turbidity phenomenon occurs in the base material of the optical element, transmissivity of the optical element decreases, and strong scattering light is caused. As a result, the optical performance of the optical system of an optical pick-up deteriorates. The white turbidity phenomenon frequently occurs when resin having a relatively large degree of absorption at the wavelength of blue laser is used as material of the optical element.

Various analyses for preventing occurrence of the white turbidity phenomenon are now being made. For example, Japanese Patent Provisional Publication No. 2005-266780A discloses a technique where an addition agent, such as a soft polymer or an alcoholic compound, is added to the resign forming the base material so that the property of the resin is altered to become hard to cause the white turbidity phenomenon.

However, if a new resin material is employed, it becomes necessary to conduct various types of appropriateness reevaluations concerning the resin base material, such as a processing condition of the base material, various optical films to be coated on the base material and an adhesive agent, in addition to conducting evaluation of the new resin itself. Therefore, use of a new resin material involves a high degree of risk and the cost increase. It is desired to prevent occurrence of the white turbidity by a technique other than altering the resin base material.

SUMMARY OF THE INVENTION

The present invention is advantageous in that it provides at least one of an objective lens, an optical system of an optical pick-up and an optical information recording/reproducing apparatus configured to prevent occurrence of the white turbidity by use of blue laser under a high temperature condition even when a material which exhibits a high degree of absorption at the wavelength of blue laser is used as the base material.

According to an aspect of the invention, there is provided an objective lens for an optical information recording/reproducing optical system for recording information to and/or reproducing information from an optical disc by letting a laser beam impinge on a recording layer of the optical disc. A center wavelength $\lambda$ (unit: nm) of the laser beam falls within a range defined by a following condition:

$$390 \leq \lambda \leq 420 \qquad (1).$$

A base material of the objective lens is made of resin. The resin has a glass transition temperature Tg and light transmissivity T (unit: %) per a path length of 3 mm at a wavelength of 406 nm defined by following conditions:

$$Tg \geq 115^\circ C. \qquad (2),$$

$$85 \leq T \leq 90 \qquad (3).$$

Same antireflection films or different types of antireflection films are respectively formed on optical surfaces of the objective lens. Each of the antireflection films formed on the objective lens has a thickness of 100 nm or more in a vicinity of an optical axis of the objective lens.

With this configuration, it becomes possible to prevent occurrence of the white turbidity in a base material of an optical component, such as an objective lens.

All of the factors causing the white turbidity have not been elucidated. However, it is considered that oxidation deterioration of the resin by oxygen in the atmosphere is one of the factors of the white turbidity. Furthermore, as the degree of molecular motion in the resin becomes more active, oxygen tends to be diffused in the resin, an oxidation reaction is activated, and therefore the white turbidity tends to occur. Under a constant temperature condition, as the glass transition temperature of the resin becomes high, the molecular motion becomes moderate, and therefore a reaction such as white turbidity becomes hard to occur. For example, when the resin is used in the relatively high temperature condition of around 90° C., the adequate effect of preventing occurrence of the white turbidity can be achieved by using the resin having the glass transition temperature Tg of 115° C. or more as the base material. Furthermore, as the degree of absorption of the blue laser light increases (or the ambient temperature increases), the white turbidity occurs more easily. When the light transmissivity T gets lower than the lower limit of the condition (3), the transmissivity of the blue laser light decreases considerably, and therefore a desired optical performance can not be obtained. When the light transmissivity T gets higher than the upper limit of the condition (3), the absorption of the blue laser light becomes small, and the white turbidity phenomenon hardly occurs. Therefore, in this case, there is no necessity to take measures against the white turbidity phenomenon. Accordingly, by configuring the objective lens as described above, the amount of oxygen supplied to the base material through the antireflection film can be suppressed, and therefore the white turbidity caused when the objective lens is irradiated with the blue laser light having a high intensity for a long time can be reduced or occurrence of the white turbidity can be substantially prevented.

By taking the above described measures for the material that has the large degree of absorption for the blue laser light and would cause the white turbidity easily, an adequate degree of light-resisting property can be achieved, and the degree of design freedom can be decreased because the range of choices of the material is increased.

In at least one aspect, each of the antireflection films may have a high density layer formed by vacuum deposition under a degree of vacuum of $10^{-2}$ Pa or less. In this case, a thickness of the high density layer in the vicinity of the optical axis may be 40 nm or more. a The degree of vacuum of $10^{-2}$ Pa or less means that a high degree of vacuum where the barometric pressure is lower than or equal to $10^{-2}$ Pa. Preferably, the thickness of the high density layer is 70 nm or more. More preferably, the thickness of the high density layer is 100 nm or more. When the high density layer is formed by vacuum deposition, the degree of vacuum may be $10^{-3}$ Pa or less, and more preferably $10^{-4}$ Pa or less.

The high density layer formed under the above described high degree of vacuum condition has a high film density, and therefore has a low degree of permeability to oxygen. By forming the high density layer having the low degree of permeability to oxygen to have the thickness of 40 nm or more, it becomes possible to suppress movement of the oxygen from the atmosphere around the objective lens to the base material through the antireflection film. Furthermore, by increasing the thickness of the high density layer or forming the high density layer under a further higher degree of vacuum condition, it becomes possible to more effectively prevent movement of oxygen to the base material through the antireflection film.

In at least one aspect, each of the antireflection films may have a high density layer formed by sputtering. A thin film formed by sputtering has a high film density and exhibits a low degree of permeability to oxygen gas. Therefore, the film formed by sputtering has a high degree of effect of preventing occurrence of the white turbidity.

In at least one aspect, at least one of layers configuring each of the antireflection films may be made of silicon oxide, aluminum oxide or a mixture of silicon oxide and aluminum oxide. The thus formed layer has a characteristic that the degree of vacuum can be easily set to be high.

In at least one aspect, the glass transition temperature Tg of the objective lens may satisfy a following condition:

$$Tg \geq 125° C. \qquad (4).$$

There is a case where the temperature of the optical information recording/reproducing optical system reaches close to 90° C. depending on the use condition. In order to an adequate light-resisting property to the objective lens under such a high temperature condition, it is necessary to use the base material having the glass transition temperature of 125° C. or more.

In at least one aspect, each of the antireflection films may be one of a single layer film and a multilayer film having four layers or less. Since a multilayer film having five layers or more exhibits a complicated waveform of the wavelength property, so that the jitter may increase when the optical information recording/reproducing optical system is configured by using the above described objective lens.

In at least one aspect, the antireflection film on a light source side optical surface of the objective lens to which the laser beam from a light source enters may be formed such that $\lambda_{B1}$ (unit: nm) at which reflectivity at vertical incidence takes a minimum value falls within a following range:

$$600 < \lambda_{B1} < 800 \qquad (5).$$

When the antireflection film is formed on an optical surface of an optical component, such as an objective lens, the film is formed in a state where an optical axis of the optical surface faces a sputtering source. It has been found that as the tilting angle with respect to the optical axis (i.e., an angle formed between a normal to the optical surface and the optical axis) increases, the thickness of the antireflection film formed on the optical surface decreases. In order to secure an adequate thickness of the film at the peripheral position away from the optical axis, it is necessary to provide the thick antireflection film satisfying the condition (5). By forming the antireflection film to satisfy the condition (5), an adequate degree of effect of preventing occurrence of the white turbidity. Furthermore, by giving such an wavelength property to the antireflection film formed on the light source side optical surface, it becomes possible to increase reflectivity at the central part and to decrease reflectivity at the peripheral part. As a result, the rim intensity can be decreased. Therefore, a slim beam west can be formed on the recording layer of the optical disc, and therefore, a more suitable jitter property can be achieved. When the $\lambda_{B1}$ gets higher than the upper limit of the condition (5), the reflectivity becomes excessively large, and therefore a desired optical property can not be obtained.

In at least one aspect, the antireflection film on an optical disc side optical surface of the objective lens from which the laser beam exits may be formed such that $\lambda_{B2}$ (unit: nm) at which reflectivity at vertical incidence takes a minimum value falls within a following range:

$$430 < \lambda_{B2} < 600 \qquad (6).$$

In order to secure an adequate thickness of the antireflection film on the optical disc side optical surface of the objective lens, it is preferable to satisfy the condition (6). When $\lambda_{B2}$ gets higher than the upper limit of the condition (6), the transmissivity at the central part of the objective lens where the optical axis perpendicularly intersects with the optical surface drops considerably, and therefore the total transmissivity decreases excessively.

In at least one aspect, the antireflection film formed on an optical disc side optical surface of the objective lens from which the laser beam exits may be a three layer film formed by stacking, on the base material, first to third layers in this order from a base material side. In this case, when n1 to n3 respectively represent refractive indexes of the first to third layers at the wavelength of 406 nm and d1 to d3 (unit: nm) respectively represent thicknesses of the first to third layers, the refractive indexes n1 to n3 and the thicknesses d1 to d3 satisfy conditions:

First Layer: $n1 \leq 1.55$, $50 \leq d1 \leq 200$
Second Layer: $1.55 < n2 \leq 1.70$, $40 \leq d2 \leq 150$
Third Layer: $n3 \leq 1.55$, $50 \leq d3 \leq 200$.

According to another aspect of the invention, there is provided an optical information recording/reproducing apparatus for recording information to and/or reproducing information from an optical disc by letting a laser beam impinge on a recording layer of the optical disc. The optical information recording/reproducing apparatus includes the above described objective lens.

With this configuration, it becomes possible to prevent occurrence of the white turbidity in a base material of an optical component, such as an objective lens.

According to another aspect of the invention, there is provided an optical information recording/reproducing optical system for recording information to and/or reproducing information from an optical disc by letting a laser beam impinge on a recording layer of the optical disc. The optical information recording/reproducing optical system includes a light source that emits the laser beam; an optical element that converts the laser beam emitted by the light source into a substantially collimated beam; and the above described objective lens that converges the laser beam emerging from the optical element onto the recording layer of the optical disc.

With this configuration, it becomes possible to prevent occurrence of the white turbidity in a base material of an optical component, such as an objective lens.

In at least one aspect, the same antireflection films or the different types of antireflection films may be respectively formed on optical surfaces of the optical element. In this case, resin forming a base material of the optical element may have a glass transition temperature Tg and light transmissivity T (unit: %) per a path length of 3 mm at the wavelength of 406 nm defined by the conditions (2) and (3).

BRIEF DESCRIPTION OF THE ACCOMPANYING DRAWINGS

FIG. 1 is a block diagram generally illustrating a configuration of an optical system of an optical pick-up to be mounted on an optical information recording/reproducing apparatus according to an embodiment of the invention.

DETAILED DESCRIPTION OF THE EMBODIMENTS

Hereinafter, an embodiment according to the invention are described with reference to the accompanying drawings.

FIG. 1 is a block diagram generally illustrating a configuration of an optical system of an optical pick-up 100 to be mounted on an optical information recording/reproducing apparatus according to the embodiment of the invention. The optical information recording/reproducing apparatus according to the embodiment is configured to record information to and/or reproduce information from a high-density optical disc (hereafter, simply referred to as an "optical disc D0") complying with a BD standard.

As shown in FIG. 1, the optical system of an optical pick-up 100 includes a light source 1, a half mirror 2, a collimator lens 3, an objective lens 4 and a photoreceptor 5. In FIG. 1, a chain line indicates a reference axis AX of the optical system of an optical pick-up 100, and a thin solid line indicates a light beam proceeding to the optical disc D0 and a returning light beam from the optical disc D0. In the following explanation, a light source side optical surface of the collimator lens 3 is referred to as a surface A (31), an objective lens side surface of the collimator lens 3 is referred to as a surface B (32), an optical surface of the objective lens 3 to which the laser beam emerging from the surface B (32) enters is referred to as a surface C (41), and an optical surface of the objective lens through which the laser beam exits is referred to as a surface D (42).

The optical disc D0 has a protective layer and a recording layer (not shown). In actuality, in the optical disc D0, the recording layer is sandwiched by the protective layer and a substrate layer (or a label layer). The information recording or information reproducing is executed by letting the laser beam from the light source 1 enter the recording layer of the optical disc D0 in a state where the optical disc D0 is placed on a turn table (not shown).

The light source 1 is a semiconductor laser which emits blue laser light having a design wavelength of 406 nm. In general, a center wavelength λ (unit: nm) of Fabry-Perot type semiconductor laser used for an optical system of an optical pick-up fluctuates within a range of several nm to several tens of nm (e.g., 390-420 nm) depending on individual differences and use environments of the semiconductor lasers.

As shown in FIG. 1, the laser beam emitted from the light source 1 is deflected by the half mirror 2 to be incident on the surface A (31) of the collimator lens 3. The laser beam which has entered the collimator 3 is then converted into to a collimated beam, and is incident on the surface C (41) of the objective lens 4 after exiting from the collimator lens 3 through the surface B (32). The laser beam is converged by the objective lens 4 in the vicinity of the recording layer of the optical disc D0 to form a suitable beam spot with a small amount of aberration on the recording layer of the optical disc D0. The laser beam reflects from the recording layer of the optical disc D0, and returns along the same optical path along which the laser beam proceeds to the optical disc D0. Then, the returning laser beam is received by the photoreceptor 5 through the half mirror 2.

The photoreceptor 5 executes photoelectric conversion for the received laser beam to generate an analog signal, and outputs the analog signal to a signal processing circuit (not shown). The signal processing circuit executes an error correction process while converting the analog signal into a bit stream. Then, the signal processing circuit separates streams (e.g., an audio stream and a video stream) from the bit stream for which the error correction has been executed, and decodes each separated stream. Then, the signal processing circuit converts an audio signal and a video signal which have been obtained by decoding, into analog signals to be output through a speaker and a display (not shown), respectively. Thus, audio and video recorded in the optical disc D0 are reproduced through the speaker and the display.

The objective lens 4 is configured such that a numerical aperture thereof on the optical disc side at the wavelength λ falls, for example, within a range from 0.8 to 0.87 so that the information recording and information reproducing can be suitably executed.

Each of the collimator lens 3 and the objective lens 4 is a resin lens made of synthetic resin by molding. Since a resin lens is lighter in weight than a glass lens, it is possible to reduce a load to be placed on an actuator for driving a lens (not shown) by employing a resin lens. Furthermore, a resin lens has a glass transition temperature which is considerably lower than that of a glass lens. Therefore, a resin lens can be molded in a lower temperature condition and can be manufactured more easily than a glass lens. Consequently, the amount of energy consumption for manufacturing of a resin lens is lower than that of a glass lens. Furthermore, a resin lens hardly becomes cracked and can be handled easily. Therefore, resin lenses are suitable for cost reduction by mass production. As material of each of the collimator lens 3 and the objective lens 4, resin having a refractive index n of 1.4 to 1.7 at the design wavelength (406 nm) is selected. It should be noted that the base material of the collimator lens 3 and the base material of the objective lens 4 may be the same type of resin or may be different types of resins.

The base material of the objective lens 4 is resin which has a relatively strong absorption at a wavelength region of the blue laser and has light transmissivity (transmissivity per an optical path of 3 mm) of 85 to 90% at the design wavelength (406 nm). Hereafter, the light transmissivity means transmissivity per an optical path of 3 mm. The white turbidity phenomenon occurs when such a resin base material having a relatively strong absorption property at the wavelength region of the blue laser is irradiated with the blue laser light having an intensity of a certain value or more for a long time. Therefore, when the resign having the light transmissivity of 85 to 90% is used, it is required to take measures against occurrence of the white turbidity. When resin having the light transmissivity of 85% or less is used, excessively large loss of power is caused, and therefore it becomes difficult to prevent occurrence of the white turbidity. Therefore, use of the resin having the light transmissivity of 85% or less is not practicable.

Incidentally, the inventors of the present invention have concluded that, through analysis of various documents and unique experiments, the white turbidity phenomenon occurring in an optical element by blue laser light results from oxidation of the resin base material. It is the inventor's theory that, by configuring the optical element such that oxygen is hard to enter the inside of the base material, it becomes possible to prevent occurrence of the white turbidity phenomenon, or it becomes possible to suppress progress of the white turbidity phenomenon and thereby to give the adequate light-resisting property to the optical element. For this reason, as the base material of the objective lens 4 according to the embodiment, the resin having the glass transition temperature Tg of 115° C. or more (preferably, 120° C. or more, and more preferably 130° C. or more) is used. The white turbidity phenomenon progresses fast in the high temperature environment. However, progress of the white turbidity phenomenon becomes slow as the glass transition temperature Tg becomes high. It is considered that the reason is that the diffusion coefficient of oxygen molecules in the resin rapidly increases around the glass transition temperature. That is, if the glass transition temperature Tg of the base material is sufficiently higher than the temperature of the base material in operation, the speed of diffusion of oxygen in the base material becomes low, and therefore the white turbidity phenomenon becomes hard to progress. Optical resin which has light transmissivity of 85% to 90% and has the glass transition temperature Tg of 115° C. or more is available, for example, as APL5014DP, from MITSUI CHEMICAL, INC.

In this embodiment, an antireflection film including a high density layer formed by vacuum deposition in a high degree of vacuum condition or formed by sputtering is formed on each of surfaces of the objective lens 4. That is, an antireflection film including the high density layer having a low diffusion coefficient of oxygen molecules is formed on each of the surfaces of the objective lens 4. With this configuration, supplying of oxygen into the base material can be prevented, and thereby the white turbidity phenomenon can be reduced. Specifically, it is preferable that an antireflection film including a high density layer formed of one of a low refractive index layer (formed of silicon oxide, aluminum oxide, aluminum fluoride, magnesium fluoride or a mixture of these materials) and a high refractive index layer (including tantalum oxide) by sputtering or by vacuum deposition under the degree of vacuum of $10^{-2}$ or less (unit Pa) is formed on each of the optical surfaces of the objective lens 4. In order to sufficiently decrease the permeating speed of oxygen molecules through the antireflection film, the antireflection film is formed such that the thickness thereof around the optical axis is 100 nm or more (preferably, 150 nm or more, and more preferably 200 nm or more). Furthermore, in this embodiment, a film containing the silicon oxide is formed, as the high density layer, by the vacuum deposition under a high degree of vacuum condition or sputtering. The high density layer has the thickness of 40 nm or more (preferably 80 nm or more, more preferably 150 nm or more) around the optical axis. In the vicinity of the optical axis, the power density of laser light is high, and therefore the white turbidity phenomenon progresses fast. For this reason, in order to prevent oxygen from entering into the base material around the optical axis, the film is formed to have the thickness of a certain value or more around the optical axis. The antireflection film can be formed in various film-making ways, such as vacuum deposition or sputtering. In particular, a film formed by sputtering has a high film density and a low permeability for oxygen, and therefore a film formed by sputtering has a high efficiency for prevention of the white turbidity phenomenon.

Since the surface C (41) of the objective lens 4 on which the laser beam from the light source 1 enters has a large curvature, an angle of the lens surface at the periphery of the surface C (41) (i.e., an angle formed between the optical axis and a normal to the lens surface) becomes large. For normal film-making, the thickness of the film becomes smaller as the angle of the lens surface becomes larger, the target wavelength at which the reflectivity takes a minimum value shifts largely toward the short wavelength side, and the reflectivity becomes extremely large. Conventionally, an antireflection film is formed such that the reflectivity becomes small at vertical incidence (i.e., the reflectivity becomes small for light close to the optical axis). Therefore, the reflectivity becomes extremely large for a peripheral part of the light beam having a large incident angle. For this reason, decrease of the rim intensity (a ratio of the intensity of light passing through a peripheral part of an objective lens to the intensity of light passing through a central part close to an optical axis of an objective lens) is caused when the light beam passes through the surface C (41). When the rim intensity decreases, the intensity distribution of the laser beam shifts from a Gaussian curve. In this case, a problem arises that the beam west of the laser beam can not be decreased at the recording layer of the optical disc D0, and the jitter increases. For this reason, according to the embodiment, the antireflection film formed on the surface C (41) of the objective lens 4 (i.e., the surface on which the laser beam from the light source is incident) is formed to have a relatively large thickness so that the valley wavelength $\lambda_{min(C)}$ at which the reflectivity in the vicinity of the optical axis takes a minimum value falls within a range of 600 nm to 800 nm. With this configuration, an adequate thickness of the film can be secured at the peripheral part of the light beam, and therefore the adequate effect of preventing occurrence of the white turbidity phenomenon can be secured. Furthermore, since the reflectivity difference on the surface C (41) between the light ray close to the optical axis and the light ray at the peripheral part of the laser beam is reduced, it becomes possible to form a thin beam west and the jitter property can be improved. Furthermore, the antireflection film formed on the surface D (42) of the objective lens 4 from which the laser beam emerges is formed to have a relatively large thickness so that the valley wavelength $\lambda_{min(D)}$ at which the reflectivity takes a minimum value falls within a range of 430 nm to 600 nm. With this configuration, it becomes possible to secure the adequate thickness of the film necessary for suppressing permeating of oxygen through the antireflection film on the exit side of the objective lens. When the valley wavelength gets lower than the lower limit of the above described range, an adequate effect of preventing occurrence of the white turbidity phenomenon can not be obtained. When the valley wavelength gets larger than the upper limit of the above described range, the transmissivity decreases largely at the center portion of the lens where the lens surface is orthogonal to the optical axis, and therefore the total transmissivity excessively decreases.

It should be noted that the base resin material of the collimator lens 3 may have the light transmissivity of 85% to 90% at the design wavelength, or may have the light transmissivity of 90% or more at the design wavelength. The maximum formed on the optical surfaces of the collimator lens 3 may have the same structure or may have the different types of antireflection films.

In the following, ten examples of the objective lens according to the embodiment will be explained. Table 1 shows the structure of each optical surface of the objective lens, for each of the first to tenth examples.

TABLE 1

|  |  |  | Example 1 | Example 2 | Example 3 | Example 4 | Example 5 |
|---|---|---|---|---|---|---|---|
| Antireflection Film | 1st Layer | Material | Silicon Oxide | Silicon Oxide | Silicon Oxide | Silicon Oxide | Silicon Oxide |
|  |  | n1 | 1.46 | 1.46 | 1.46 | 1.46 | 1.46 |
|  |  | d1 | 31 nm | 51 nm | 51 nm | 14 nm | 17 nm |
|  | 2nd Layer | Material | Aluminum Oxide | Aluminum Oxide | Aluminum Oxide | Aluminum Oxide | Aluminum Oxide |
|  |  | n2 | 1.64 | 1.64 | 1.64 | 1.64 | 1.64 |
|  |  | d2 | 55 nm | 38 nm | 84 nm | 23 nm | 53 nm |
|  | 3rd Layer | Material | Silicon Oxide | Silicon Oxide | Silicon Oxide | Tantalum Oxide | Tantalum Oxide |
|  |  | n3 | 1.46 | 1.46 | 1.46 | 1.94 | 1.94 |
|  |  | d3 | 99 nm | 104 nm | 86 nm | 60 nm | 71 nm |
|  | 4th Layer | Material |  |  |  | Silicon Oxide | Aluminum Oxide |
|  |  | n4 |  |  |  | 1.49 | 1.64 |
|  |  | d4 |  |  |  | 125 nm | 111 nm |
| Base Material | Light Transmissivity |  | 87.5% | 87.5% | 87.5% | 87.5% | 87.5% |
|  | Tg |  | 135° C. | 135° C. | 135° C. | 135° C. | 135° C. |
| Valley Wavelength λmin |  |  | 465 nm | 440 nm | 490 nm | 660 nm | 645 nm |
|  |  |  | Example 6 | Example 7 | Example 8 | Example 9 | Example 10 |
| Antireflection Film | 1st Layer | Material | Silicon Oxide | Tantalum Oxide | Tantalum Oxide | Tantalum Oxide | Tantalum Oxide |
|  |  | n1 | 1.46 | 1.94 | 1.94 | 1.94 | 1.94 |
|  |  | d1 | 69 nm | 12 nm | 25 nm | 50 nm | 50 nm |
|  | 2nd Layer | Material | Aluminum Oxide | Silicon Oxide | Silicon Oxide | Silicon Oxide | Silicon Oxide |
|  |  | n2 | 1.64 | 1.46 | 1.46 | 1.46 | 1.46 |
|  |  | d2 | 62 nm | 100 nm | 105 nm | 142 nm | 95 nm |
|  | 3rd Layer | Material | Silicon Oxide |  |  |  |  |
|  |  | n3 | 1.46 |  |  |  |  |
|  |  | d3 | 69 nm |  |  |  |  |
|  | 4th Layer | Material | Aluminum Oxide |  |  |  |  |
|  |  | n4 | 1.64 |  |  |  |  |
|  |  | d4 | 62 nm |  |  |  |  |
| Base Material | Light Transmissivity |  | 87.5% | 87.5% | 87.5% | 87.5% | 87.5% |
|  | Tg |  | 135° C. | 135° C. | 135° C. | 135° C. | 135° C. |
| Valley Wavelength λmin |  |  | 645 nm | 445 nm | 485 nm | 700 nm | 510 nm | power density of the blue laser beam on the collimator lens 3 is 20% to 25% of the maximum power density of the blue laser beam on the objective lens 4. For this reason, even if the resin which tends to cause the white turbidity phenomenon is used, it is not necessary to provide the antireflection film having the effect of preventing occurrence of the white turbidity phenomenon (such as the antireflection film formed on the objective lens 4) on the collimator lens 3. Therefore, a general antireflection film not having the effect of preventing occurrence of the white turbidity phenomenon may be formed on each of the optical surfaces of the collimator lens 3. When the antireflection film having the effect of preventing occurrence of the white turbidity phenomenon is formed on the collimator lens 3, the optical performance of the antireflection film is not particularly limited. Typically, the antireflection film formed on an optical surface of the collimator lens 3 is designed such that the reflectivity is minimized at vertical incidence of light with the design wavelength. It is preferable to from the antireflection film on each of the optical surfaces of the collimator lens 3. The antireflection films In each of the examples, the light transmissivity T (85.7%) at the design wavelength 406 nm is lower than or equal to 90%, and the base material is the resin having the relatively large degree of absorption for the blue laser light which may cause the white turbidity phenomenon. However, the resin base material has the glass transmission temperature Tg larger than or equal to 130° C. (135° C.), the oxidative reaction which causes the white turbidity phenomenon does not progress rapidly.

The antireflection film according to each of the examples is formed to be a multilayer film including at least one silicon oxide layer, and has the thickness of 100 nm or more. In particular, the film according to each of the examples 1-6 and 9 has the thickness of 150 nm or more, and the film according to each of the examples 3 to 6 has the very large thickness of 200 nm or more. Therefore, it becomes possible to effectively prevent oxygen from entering into the base material. The total thickness of 80 nm or more is secured for the high density layer made of the silicon oxide. In particular, in the example 2, the total thickness of the silicon oxide layer is 150 nm or more, and therefore it becomes possible to extremely suitably prevent oxygen from entering into the base material.

To the surface C (41) of the objective lens 4, the optical surface according to any of the examples can be applied. In particular, in the examples 4 to 6 and 9, the valley wavelength λmin is within the range of 600 to 800 nm, and therefore the decrease of the rim intensity can be prevented while securing the adequate effect of preventing occurrence of the white turbidity phenomenon.

To the surface D (42) of the objective lens 4, any of the examples 1 to 3, 7 to 8 and 10 can be applied. Since the optical surfaces of these examples have the valley wavelength λmin falling within the range of 430 to 600 nm (440 to 510 nm), the required thickness of the antireflection film can be secured while suppressing decrease of the transmissivity to some extent. As a result, the adequate effect of preventing occurrence of white turbidity phenomenon can be achieved.

In the optical system of an optical pick-up 100, the position of the collimator lens 3 along the optical axis may be adjusted to correct the spherical aberration that would occur due to, for example, difference in thickness of the cover layer of the optical disc, the difference in wavelength or the temperature variations. It should be noted that, in the case where the collimator lens 3 is shifted from the state shown in FIG. 2 to correct the spherical aberration, the collimator lens 3 may be expressed as an optical element that converts the laser beam emitted by the light source 1 into a substantially collimated beam.

Although the present invention has been described in considerable detail with reference to certain preferred embodiments thereof, other embodiments are possible.

This application claims priority of Japanese Patent Applications No. P2009-253197 filed on Nov. 4, 2009, and No. P2010-181888 filed on Aug. 16, 2010. The entire subject matter of the applications is incorporated herein by reference.

What is claimed is:

1. An objective lens for an optical information recording/reproducing optical system for recording information to and/or reproducing information from an optical disc by letting a laser beam impinge on a recording layer of the optical disc, wherein:

a center wavelength λ (unit: nm) of the laser beam falls within a range defined by a following condition:

$$390 \leq \lambda \leq 420 \tag{1};$$

a base material of the objective lens is made of resin;
the resin has a glass transition temperature Tg and light transmissivity T (unit: %) per a path length of 3 mm at a wavelength of 406 nm defined by following conditions:

$$Tg \geq 115° C. \tag{2},$$

$$85 \leq T \leq 90 \tag{3};$$

same antireflection films or different types of antireflection films are respectively formed on optical surfaces of the objective lens; and
each of the antireflection films formed on the objective lens has a thickness of 100 nm or more in a vicinity of an optical axis of the objective lens.

2. The objective lens according to claim 1, wherein:
each of the antireflection films has a high density layer formed by vacuum deposition under a degree of vacuum of $10^{-2}$ Pa or less; and
a thickness of the high density layer in the vicinity of the optical axis is 40 nm or more.

3. The objective lens according to claim 1, wherein each of the antireflection films has a high density layer formed by sputtering.

4. The objective lens according to claim 1, wherein at least one of layers configuring each of the antireflection films is made of silicon oxide, aluminum oxide or a mixture of silicon oxide and aluminum oxide.

5. The objective lens according to claim 1, wherein the glass transition temperature Tg of the objective lens satisfies a following condition:

$$Tg \geq 125° C. \tag{4}.$$

6. The objective lens according to claim 1, wherein each of the antireflection films is one of a single layer film and a multilayer film having four layers or less.

7. The objective lens according to claim 1,
wherein the antireflection film on a light source side optical surface of the objective lens to which the laser beam from a light source enters is formed such that $\lambda_{B1}$ (unit: nm) at which reflectivity at vertical incidence takes a minimum value falls within a following range:

$$600 < \lambda_{B1} < 800 \tag{5}.$$

8. The objective lens according to claim 1,
wherein the antireflection film on an optical disc side optical surface of the objective lens from which the laser beam exits is formed such that $\lambda_{B2}$ (unit: nm) at which reflectivity at vertical incidence takes a minimum value falls within a following range:

$$430 < \lambda_{B2} < 600 \tag{6}.$$

9. The objective lens according to claim 1,
wherein the antireflection film formed on an optical disc side optical surface of the objective lens from which the laser beam exits is a three layer film formed by stacking, on the base material, first to third layers in this order from a base material side; and
when n1 to n3 respectively represent refractive indexes of the first to third layers at the wavelength of 406 nm and d1 to d3 (unit: nm) respectively represent thicknesses of the first to third layers, the refractive indexes n1 to n3 and the thicknesses d1 to d3 satisfy conditions:
First Layer: $n1 \leq 1.55$, $50 \leq d1 \leq 200$
Second Layer: $1.55 < n2 \leq 1.70$, $40 \leq d2 \leq 150$
Third Layer: $n3 \leq 1.55$, $50 \leq d3 \leq 200$.

10. An optical information recording/reproducing apparatus for recording information to and/or reproducing information from an optical disc by letting a laser beam impinge on a recording layer of the optical disc, comprising an objective lens,
wherein:
a center wavelength λ (unit: nm) of the laser beam falls within a range defined by a following condition:

$$390 \leq \lambda \leq 420 \tag{1};$$

a base material of the objective lens is made of resin;
the resin has a glass transition temperature Tg and light transmissivity T (unit: %) per a path length of 3 mm at a wavelength of 406 nm defined by following conditions:

$$Tg \geq 115° C. \tag{2},$$

$$85 \leq T \leq 90 \tag{3};$$

same antireflection films or different types of antireflection films are respectively formed on optical surfaces of the objective lens; and
each of the antireflection films formed on the objective lens has a thickness of 100 nm or more in a vicinity of an optical axis of the objective lens.

11. An optical information recording/reproducing optical system for recording information to and/or reproducing information from an optical disc by letting a laser beam impinge on a recording layer of the optical disc, comprising:
  a light source that emits the laser beam;
  an optical element that converts the laser beam emitted by the light source into a substantially collimated beam; and
  an objective lens that converges the laser beam emerging from the optical element onto the recording layer of the optical disc,
  wherein:
  a center wavelength λ (unit: nm) of the laser beam falls within a range defined by a following condition:

$$390 \leq \lambda \leq 420 \quad (1);$$

a base material of the objective lens is made of resin;
  the resin has a glass transition temperature Tg and light transmissivity T (unit: %) per a path length of 3 mm at a wavelength of 406 nm defined by following conditions:

$$Tg \geq 115° C. \quad (2),$$

$$85 \leq T \leq 90 \quad (3);$$

same antireflection films or different types of antireflection films are respectively formed on optical surfaces of the objective lens; and
  each of the antireflection films formed on the objective lens has a thickness of 100 nm or more in a vicinity of an optical axis of the objective lens.

12. The optical information recording/reproducing optical system according to claim 11,
  wherein the same antireflection films or the different types of antireflection films are respectively formed on optical surfaces of the optical element.

13. The optical information recording/reproducing optical system according to claim 11,
  wherein resin forming a base material of the optical element has a glass transition temperature Tg and light transmissivity T (unit: %) per a path length of 3 mm at the wavelength of 406 nm defined by the conditions (2) and (3).

14. The optical information recording/reproducing optical system according to claim 11,
  wherein:
  each of the antireflection films has a high density layer formed by vacuum deposition under a degree of vacuum of $10^{-2}$ Pa or less; and
  a thickness of the high density layer in the vicinity of the optical axis is 40 nm or more.

15. The optical information recording/reproducing optical system according to claim 11, wherein at least one of the antireflection films is formed by sputtering.

16. The optical information recording/reproducing optical system according to claim 11, wherein the glass transition temperature Tg of the objective lens satisfies a following condition:

$$Tg \geq 125° C. \quad (4).$$

* * * * *